Aug. 25, 1925.

A. BINGHAM 1,550,776

CONFECTIONERY COATING MACHINE

Filed March 19, 1924   3 Sheets-Sheet 1

INVENTOR:

Arthur Bingham.

ATTORNEY:

INVENTOR:
Arthur Bingham.
ATTORNEY:

Aug. 25, 1925.                                                                1,550,776
A. BINGHAM
CONFECTIONERY COATING MACHINE
Filed March 19, 1924         3 Sheets-Sheet 3
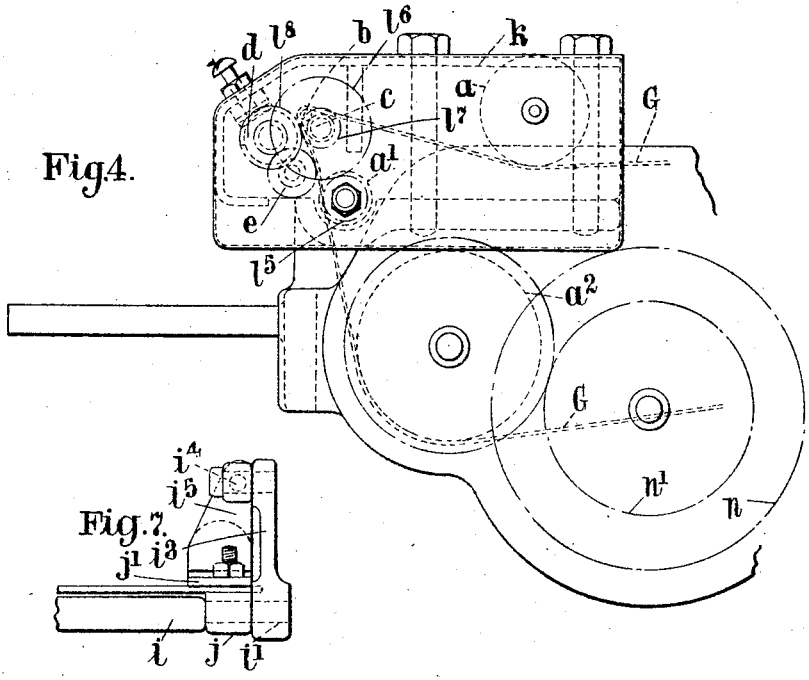
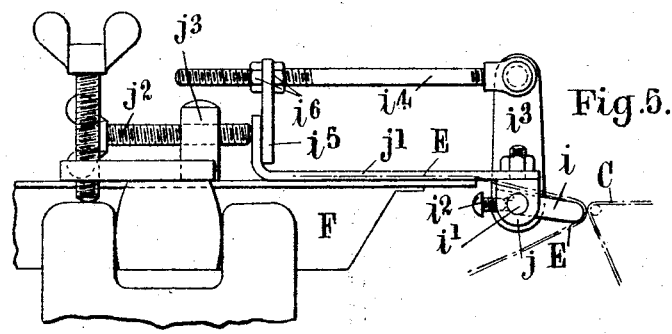
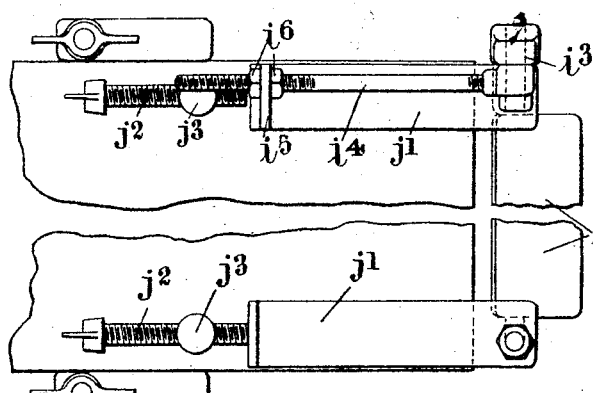
INVENTOR:
Arthur Bingham.
ATTORNEY:

Patented Aug. 25, 1925.

1,550,776

UNITED STATES PATENT OFFICE.

ARTHUR BINGHAM, OF WESTON-SUPER-MARE, ENGLAND, ASSIGNOR TO CARSONS LIMITED, OF GLASGOW, SCOTLAND, A COMPANY ORGANIZED UNDER THE LAWS OF GREAT BRITAIN.

CONFECTIONERY-COATING MACHINE.

Application filed March 19, 1924. Serial No. 700,344.

*To all whom it may concern:*

Be it known that I, ARTHUR BINGHAM, residing at Weston-super-Mare, in the county of Somerset, England, a subject of the King of Great Britain and Ireland, have invented certain new and useful Improvements in and Relating to Confectionery-Coating Machines, of which the following is a specification.

This invention relates to machines for coating confectionery with chocolate or other more or less liquid or semiliquid substance and the object is to provide means for preventing formation of the objectionable "tails" or "tips" of coating substance which are usually formed upon or adhere to the confections during mechanical or automatic coating operations.

The said tails are commonly produced by a portion of the coating substance being rearwardly extended from the base of the confections as they are caused to pass through the machine either from the bottom or base coating mechanism or from the upper flooding or top coating mechanism and the present invention provides mechanism or devices either at the "bottoming" position or at the delivery position or at both for eliminating or preventing such formation of the "tails."

It has been proposed to use a plain roller placed between the wire band conveyor, and the delivery band conveyor. In practice it is found that this intervening roller removes a considerable amount of the covering from the underside of the confection. The present invention has for its object to provide a support for the confections giving a small contacting surface and providing clearance underneath the bottom surface of the confection, to allow the tail formed on the back end of the confection to swing or run back underneath the said confection and be re-absorbed to form a part of the bottom before reaching the final conveyor.

The invention further comprises details of construction, arrangement and combinations of parts all as pointed out in the appended claims and hereinafter fully described with reference to the accompanying drawings in which:—

Figure 1:
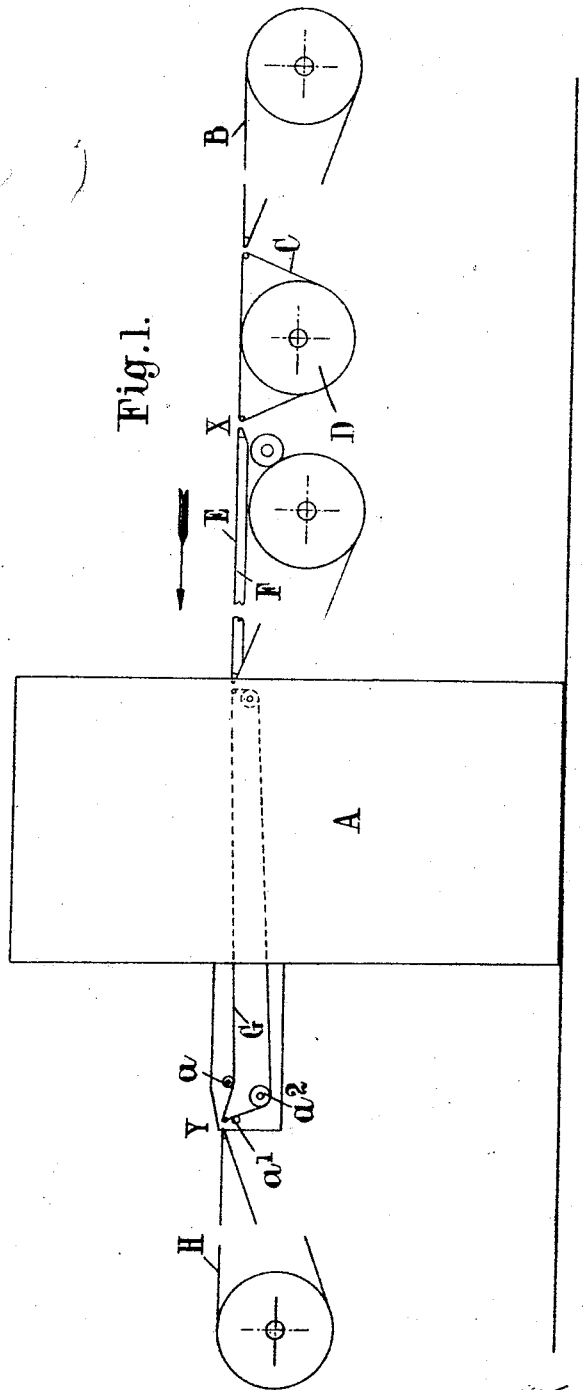
Figure 2:
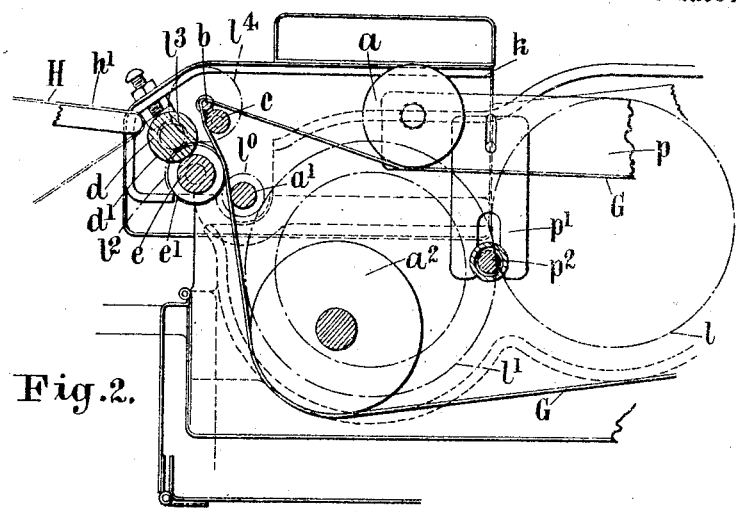
Figure 3:
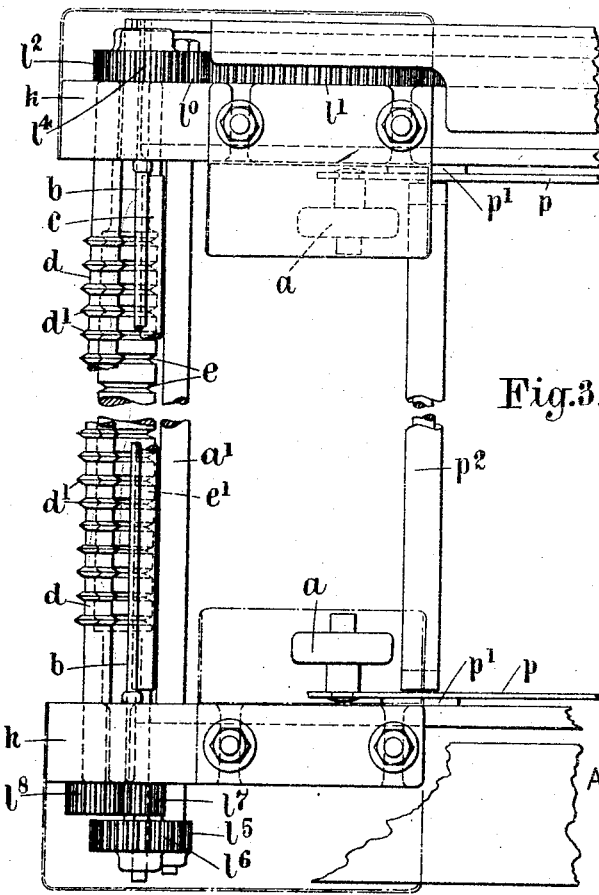

Fig. 1 is a diagram representing a confectionery coating machine of a conventional type, and showing positions at which the anti-tailing device of the present invention may be applied. Fig. 2 is a sectional detail view of the anti-tailing device and associated parts. Fig. 3 is a plan view of Fig. 2. Fig. 4 is a side elevation similar to Fig. 2. Figs. 5, 6 and 7 are detail side, plan and end views respectively of conveyor adjusting means hereinafter referred to.

The said drawings show an embodiment of the invention as applied to that class of machine in which the "centres" to be coated are passed through the machine on a travelling band or conveyor of wire or open work structure.

Fig. 1 shows diagrammatically a machine of a type known in the trade as an "Enrober" in which A designates the coating apparatus, B a canvas feed conveyor for the goods or centres to be coated and which conveys them to a wire conveyor C passing about a drum D in a tank by which a layer of coating substance is applied to the bases of the goods. From the said wire conveyor C the goods are passed to another canvas conveyor E passing over a cooling tank F which sets the bottom coating previously applied, this conveyor E passing the goods to a wire conveyor G within the coating apparatus A, where said goods receive a complete coating of the substance by flooding the latter thereover, as well known in the art. Finally the completely coated goods are passed by the conveyor G to a delivery conveyor H to be disposed of as required.

Now in such a machine the danger of formation of "tails" exists at two points, viz at X between the bottom coating device and the "cooling" conveyor E, and at Y between the "flooding" conveyor G and the delivery conveyor H; and the device of the present invention may be applied at one or other or both of said points. In the following description however it is assumed that the device is applied at the point Y which possibly in practice is the most important for the reason that the coating received on the "flooding" conveyor G is more apt to leave tails than that from the "bottoming" conveyor C.

Thus to refer specifically to Figs. 2 and 3 it will be seen that the flooding conveyor G is guided at its discharge end by rollers or equivalents $a$, $a^1$ and $a^2$; and there is provided at said discharge end two transverse rollers $b$, $c$ about the former one of which the end of the band passes, these two rollers being geared together or otherwise operated to rotate in opposite directions so that the rearmost roller keeps the foremost roller clean. Then between the end of the conveyor and the delivery conveyor H there are provided a support $d$ and a roller $e$ arranged one above the other. The support $d$ is formed at close intervals substantially throughout its length with a number of thin discs or deep flanges $d^1$ on to which the confections are fed from the conveyor G and by which they are transferred to the delivery conveyor H. The roller $e$ is shaped with other flanges $e^1$ which fit between the discs of the support $d$ and these two elements are geared together or otherwise operated to rotate in opposite directions whereby the disc support $d$ is maintained in clean condition.

In actual practice it has been found advantageous for the purpose of ensuring absolute cleanliness of the disc support $d$ to make the roller $e$ slightly larger in diameter at the centre and to mount said support $d$ in sliding bearings which can be moved towards roller $e$ by means of adjusting screws.

The said disc support $d$ is driven at a suitable peripheral speed so that the transfer to the delivery conveyor H is easily effected and the action of this support which engages the under surfaces of the coated confections with small contacting surfaces due to the provision of the thin discs $d^1$ is such that any "tails" which may be formed on the confections are removed and the coating substance forming said "tails" is discharged between the support and roller and disposed of as may be required.

It has been found in practice that as the confections are transferred by the said disc support $d$ and also by the wire conveyor G as used at present, without the interposition of the disc support, to the delivery conveyor H there is a tendency for a portion of the previously applied bottom coating to be rubbed off from a portion of the base of the goods, and to obviate this the commencing or receiving portion of the delivery conveyor H is inclined upwardly as at $h^1$ for a short distance, indicated in Fig. 2, the angle of inclination being preferably made adjustable so that the confections as they reach said conveyor move slightly backwards due to the fluidity of the base coating substance and thereby said coating is again evenly distributed on the bases.

A similar upward inclination of the "cooling" conveyor E may also be effected at the "bottoming" portion X.

In Figs. 5 to 7 means are shown for adjusting the angle of the commencing portion of the cooling conveyor by way of example. A plate $i$ about which the conveyor passes is adjustably mounted for setting purposes by means of pivots $i^1$ fixed to it in bearings $j$ which are provided for the reception of said pivots and are adjustably attached to the table or equivalent of the machine by means of brackets $j^1$. On one side of the pivots $i^1$ is fixed, by means of a screw $i^2$, a crank arm or lever $i^3$; and at the free end of this lever $i^3$ is pivoted a rod $i^4$ extending through a plate $i^5$ mounted on one of the brackets $j^1$ and adjustable in said plate by means of nuts $i^6$. Thus by adjusting the nuts and rod the lever arm $i^3$ can be swung to vary the inclination of the plate $i$. Longitudinal adjustment of the plate $i$ may be effected by shifting the brackets $j^1$ carrying the plate bearings $j$ by means of hand screws $j^2$ extending through fixed posts $j^3$.

The terminal guiding roller $b$ of the flooding conveyor G, the similar roller of the bottoming conveyor C, or again the leading roller of the delivery conveyor or cooling conveyor respectively, may with advantage be of angular section, such as triangular, as shown in connection with the roller $b$ of Fig. 2, so that as the bottom coated confections reach the conveyor from the "bottoming" mechanism and as they leave it before reaching the disc support, or again as they leave the latter for transfer to the delivery conveyor a shaking or tapping or shogging action is produced which further facilitates the removal of the "tails".

The device above mentioned, that is to say, the disc support $d$ and co-operating cleaning roller $e$ and if required, also the two final rollers $b$ and $c$ of the flooding conveyor G with the gearing or other driving mechanism mentioned may all be mounted in bearings on a bracket $k$ (Figs. 3 and 4) or similar support at each side of the machine as a self-contained unit so that such unit can be readily applied to existing machines either at the "bottoming" or delivery position or at both.

In Fig. 2, $l$ designates one of the existing driving gears of the machine which meshes with a spur wheel $l^1$ in turn meshing with a pinion $l^0$ fixed on the shaft of the roller $a^1$, this pinion gearing into a pinion $l^2$ mounted on the shaft of roller $e$, and said pinion $l^2$ engaging pinion $l^4$ mounted on roller $b$.

At the other end of the shaft of roller $a^1$ is mounted a gear $l^5$ (Fig. 4) which engages with a gear $l^6$ mounted on the shaft of roller $e$, on which shaft is mounted a pinion $l^7$ meshing with a gear $l^8$ on the shaft of the disc support $d$.

Thus it will be seen that all the rollers and the disc support are driven from one gear at one side of the machine, three of the rollers being geared together at one side and the support and two of the rollers at the other side, the lower roller $a^1$ being provided with a gear on either side of the machine.

In Figs. 2 and 3 it will be seen that the guide rollers $a$ are mounted on plates $p$ which have extensions $p^1$ adjustably mounted on a cross shaft $p^2$ of the machine to maintain tension on the conveyor G.

What I claim as my invention and desire to secure by Letters Patent of the United States is:—

1. Mechanism for preventing the formation of "tails" in the mechanical coating of confectionery comprising, in combination with two conveyors for the confections, a support located between said conveyors embodying a rotary element provided with a plurality of closely located thin discs offering a minimum contacting surface with the bases of the confections to prevent removal of coating substance therefrom.

2. Mechanism for preventing the formation of "tails" in the mechanical coating of confectionery comprising, in combination with two conveyors for the confections, a support located between said conveyors embodying a rotary element provided with a plurality of closely located thin discs offering a minimum contacting surface with the bases of the confections, and a roller co-operating with said support and having a plurality of grooves engaged by the discs of said support.

3. Mechanism for preventing the formation of "tails" in the mechanical coating of confectionery comprising, in combination with two conveyors for the confections, a support located between said conveyors embodying a rotary element provided with a plurality of closely located thin discs offering a minimum contacting surface with the bases of the confections, and a roller co-operating with said support and having a plurality of grooves engaged by the discs of said support, said support and roller being rotatable in opposite directions.

4. Mechanism for preventing the formation of "tails" in the mechanical coating of confectionery comprising, in combination with two conveyors for the confections, a support located between said conveyors embodying a rotary element provided with a plurality of closely located thin discs offering a minimum contacting surface with the bases of the confections, a roller co-operating with said support and having a plurality of grooves engaged by the discs of said support, said grooved roller being enlarged in diameter adjacent its longitudinal centre, and means for adjustably mounting the support for movement to and away from the grooved roller.

5. Mechanism for preventing the formation of "tails" in the mechanical coating of confectionery comprising, in combination with two conveyors in series, a pair of co-operating and oppositely rotated terminal rollers for the first of said conveyors, one of said rollers being of angular cross section to impart a vibratory motion to the conveyor, and a support located between said conveyors immediately adjacent said contacting rollers, said support offering a minimum contacting surface with the bases of the confections to prevent removal of coating substance therefrom.

6. Mechanism for preventing the formation of "tails" in the mechanical coating of confectionery comprising, in combination with two conveyors in series, a support located between said conveyors offering a minimum contacting surface with the bases of the confections to prevent removal of coating substance therefrom, and means for adjusting the angle of inclination of the commencing portion of the second conveyor adjacent said support.

7. Mechanism for preventing the formation of "tails" in the mechanical coating of confectionery comprising, in combination with two conveyors in series for the confections, a support located between the conveyors offering a minimum contacting surface to the bases of the confections, a pair of contacting rollers about which the terminal end of the first conveyor passes, and means for mounting said support and rollers as a self-contained unit.

8. In confectionery coating machinery, the combination of means for applying bottom coating to the confections including a conveyor, a second conveyor in series therewith, means interposed between said conveyors for eliminating "tails" comprising a support offering a minimum contacting surface with the bases of the confections, a third conveyor adapted to travel through an associated flooding device, a delivery conveyor in series with said third conveyor, and further means interposed between said two last mentioned conveyors for eliminating "tails" and comprising a support offering a minmum contacting surface with the bases of the confections.

9. Mechanism for preventing the formation of "tails" in the mechanical coating of confectionery comprising, in combination with two conveyors for the confections, a support located between said conveyors and embodying a rotary element offering a minimum contacting surface with the bases of the confections to prevent removal of coating substance therefrom.

In witness whereof I have signed this specification.

ARTHUR BINGHAM.